United States Defensive Publication [19] (H) [11] T953,008

Greminger, Jr. et al. [43] Dec. 7, 1976

[54] HYDROXYETHYLMETHYLCELLULOSE AS A PROTECTIVE COLLOID IN VINYL CHLORIDE POLYMERIZATION

[75] Inventor: George K. Greminger, Jr.; Earl H. Johnson, both of Midland, Mich.

[73] Assignee: The Dow Chemical Company, Midland, Mich.

[21] Appl. No.: 686,757

[22] Filed: May 17, 1976

[51] Int. Cl.² ..... C08F 2/20; C08F 14/06

[52] U.S. Cl. ..... 526/200; 526/344

[57] ABSTRACT

An improvement in the process for preparing polymers from vinyl chloride monomer in aqueous suspension particularly when using polymerization reaction temperatures of at least about 80°C, comprising the use of hydroxyethylmethylcellulose having a hydroxyethyl MS of about 0.7–3.5 and a methoxyl DS of about 0.6–1.6, as the protective colloid in the water phase of an oil-in-water suspension system.

2 Claims, No Drawings,
12 Pages Specification

The file of this unexamined application may be inspected and copies thereof may be purchased (849 O.G. 1221, Apr. 9, 1968).